United States Patent
Bourges-Waldegg et al.

(10) Patent No.: US 8,266,140 B2
(45) Date of Patent: Sep. 11, 2012

(54) TAGGING SYSTEM USING INTERNET SEARCH ENGINE

(75) Inventors: Daniela Bourges-Waldegg, Rueschlikon (CH); Christian Hörtnagl, Kilchberg (CH); James F. Riordan, Rueschlikon (CH); Andreas Schade, Langnau am Albis (CH)

(73) Assignee: International Business Machines Corporation, Armonk, NY (US)

( * ) Notice: Subject to any disclaimer, the term of this patent is extended or adjusted under 35 U.S.C. 154(b) by 279 days.

(21) Appl. No.: 12/403,756

(22) Filed: Mar. 13, 2009

(65) Prior Publication Data

US 2010/0235342 A1    Sep. 16, 2010

(51) Int. Cl.
*G06F 7/00* (2006.01)
*G06F 17/30* (2006.01)
(52) U.S. Cl. .................... 707/722; 707/758; 707/770
(58) Field of Classification Search .............. 707/705, 707/706, 722, 758, 770, 999.1, 999.5
See application file for complete search history.

(56) References Cited

U.S. PATENT DOCUMENTS

| | | | |
|---|---|---|---|
| 2006/0217849 A1* | 9/2006 | Obradovich et al. | 701/1 |
| 2006/0242135 A1* | 10/2006 | Weare | 707/4 |
| 2007/0192274 A1* | 8/2007 | Sugiyama et al. | 707/1 |
| 2008/0222105 A1* | 9/2008 | Matheny | 707/3 |
| 2008/0275882 A1* | 11/2008 | Kehl et al. | 707/10 |
| 2009/0113281 A1* | 4/2009 | Close et al. | 715/205 |
| 2009/0144240 A1* | 6/2009 | Singh et al. | 707/3 |
| 2009/0265631 A1* | 10/2009 | Sigurbjornsson et al. | 715/716 |
| 2009/0287674 A1* | 11/2009 | Bouillet et al. | 707/5 |
| 2010/0082575 A1* | 4/2010 | Walker et al. | 707/706 |
| 2010/0082583 A1* | 4/2010 | Chang et al. | 707/706 |
| 2010/0161620 A1* | 6/2010 | Lamere et al. | 707/749 |
| 2010/0161631 A1* | 6/2010 | Yu et al. | 707/758 |
| 2010/0281030 A1* | 11/2010 | Kusumura et al. | 707/741 |

FOREIGN PATENT DOCUMENTS

WO        2005005004        1/2005

* cited by examiner

*Primary Examiner* — Hares Jami
(74) *Attorney, Agent, or Firm* — F. Chau & Associates, LLC; William J. Stock, Esq.

(57) ABSTRACT

A method of acquiring tags using web search includes receiving a search query in a search engine, processing the search query and returning a list of candidate resources corresponding to the search query, determining a candidate resource out of the list of candidate resources, extracting tags from the search query, and tagging the candidate resource with the extracted tags.

9 Claims, 3 Drawing Sheets

President elected white
House D.C. Washington
U.S.A.

TAGGING SYSTEM USING INTERNET SEARCH ENGINE

TECHNICAL FIELD

The present disclosure relates to an automatic tagging system, and more particularly to an automatic tagging system using an internet search engine.

DISCUSSION OF RELATED ART

Web 2.0 applications represent changing trends in the use of world wide web technology and web design that aim to enhance information sharing, and collaboration among many users. The Web 2.0 applications typically involve user-generated content. Tags comprise a frequently occurring type of (or marking of) user-generated content. Tagging is used in several types of online services, for example, blog publishing, social bookmarking, or photo sharing. A typical blog publishing application can tag articles. A typical social book marking application can tag hyperlinks. A typical photo sharing application can tag images. Tags help users to navigate and organize information by applying the intuitive real-world metaphor of attaching labels to printed documents as a means to sort or categorize them by keywords.

However, to motivate the users to perform tagging in the Web 2.0 applications, incentives such as safely organizing collections of articles, bookmarks, or photos are provided. Different incentive models are also considered, when tags are needed when no obvious useful applications exist (e.g., populations of users creating tags and consuming tags are different), or when the community of interested users is relatively small compared to the set of resources that require tagging. For example, a corporate intranet may support a social bookmarking service with tagging (e.g., tagging employees to denote perceived expertise). Yet employees may create descriptive tags rarely because they are not sufficiently motivated because for instance the intranet is not accessible from outside, or there are weaker network effects due to the smaller user community than in a similar public service environment. Use of such public service by employees may put organizations at a relative disadvantage. Organizations can benefit from locally managed tags because this affords opportunities for improving enterprise applications such as improved intranet search and content filtering. The locally managed tags can also help in preventing accidental data leakage occurring in the public service environment.

In terms of related work, Amazon™ Mechanical Turk comprises a software infrastructure for distributing small, repetitive tasks to human participants (receivers of payments) and leveraging their collective input. As such it is about building new applications that involve human judgment and about monetary payment, but not about putting an existing application (e.g., web search) to a valuable secondary use. Human-based computation uses specially designed collaborative games for motivating humans to perform tasks that they perceive as valuable when aggregation occurs. However, this requires newly designed games.

SUMMARY OF THE INVENTION

According to an exemplary embodiment of the present invention, a method of acquiring tags using web search comprises entering a search query in a search engine, processing the search query and returning a list of candidate resources corresponding to the search query, selecting a candidate resource out of the list of candidate resources, extracting tags from the search query, and tagging the selected candidate resource with the extracted tags.

According to an exemplary embodiment of the present invention, a method of acquiring tags using web search comprise entering a search query in a search engine, processing the search query and returning a list of candidate resources corresponding to the search query, generating a tag cloud for each candidate resource, sorting the list of candidate resources, selecting a candidate resource, extracting tags from the search query, incrementing hit counts for the selected candidate resource and the extracted tags, and tagging the selected candidate resource with the extracted tags.

According to an exemplary embodiment of the present invention, a computer-implement method of acquiring tags using web search comprises entering a search query in a search engine, processing the search query and returning a list of candidate resources corresponding to the search query, generating a tag cloud for each candidate resource, sorting the list of candidate resources, selecting a candidate resource, extracting tags from the search query, incrementing hit counts for the selected candidate resource and the extracted tags, and tagging the selected candidate resource with the extracted tags.

BRIEF DESCRIPTION OF THE DRAWINGS

Exemplary embodiments of the present invention can be understood in more detail from the following descriptions taken in conjunction with the accompanying drawings in which.

DETAILED DESCRIPTION OF EXEMPLARY EMBODIMENTS

The invention is described more fully hereinafter with reference to the accompanying drawings, in which exemplary embodiments of the invention are shown. This invention may, however, be embodied in many different forms and should not be construed as limited to embodiments set forth herein.

Figure 1:
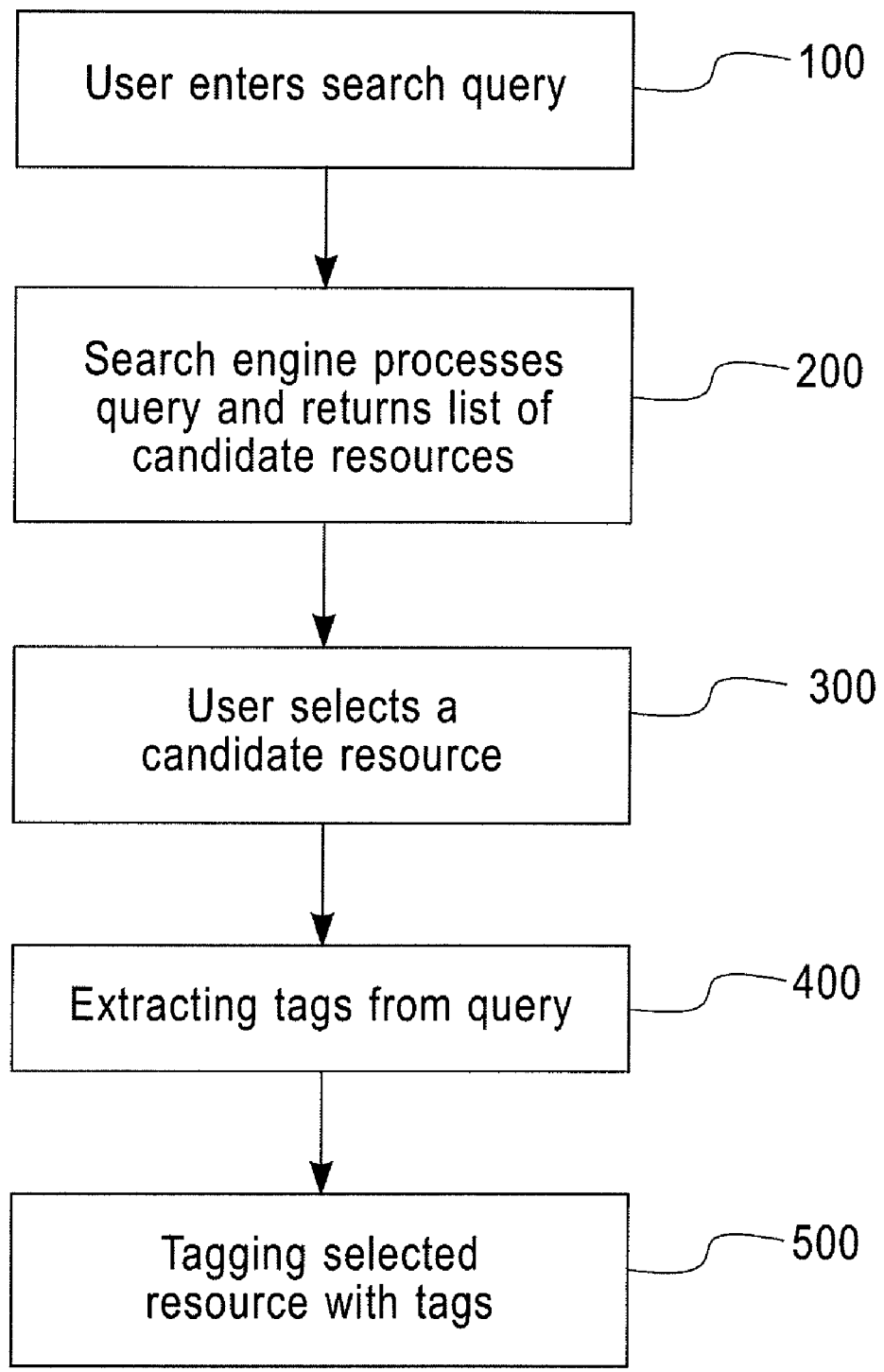
FIG. 1 describes a method of acquiring tags during web search according to an exemplary embodiment of the present invention.

FIG. 1 describes a method of acquiring tags during web search according to an exemplary embodiment of the present invention.

Referring to FIG. 1, in block 100, a user enters a search query in a window of a search engine. For example, a user can enter the phrase "White House Washington" in a search engine. In block 200, the search engine processes the query and returns a list of candidate resources. The candidate resources can be listed under resource names such as, for example, their Uniform Resource Locators (URLs). In block 300, a user selects one of the candidate resources. If the user does not select any resource, no tagging occurs.

In block 400, tags are extracted from the query. For example, search terms contained in the user query, e.g., "White House" and "Washington" can be the tags. The search terms contained in the user query undergo filtering before the search terms become candidate tags because, for example, the keywords deemed appropriate for one person might not make sense for another person. Different types of filters can be used for the filtering. Examples of the filters include a filter eliminating short articles and reducing words to syntactic base forms (e.g., plural to singular), a filter accepting only terms contained in a language dictionary or ontology, a filter considering only most frequently occurring terms (e.g., cutting off tails), a filter clustering diverging concrete terms into smaller number of more abstract and uniform terms, and a filter accepting only terms showing up in same queries by multiple different users.

In block 500, tagging the selected resource with tags occurs. For example, a piece of content such as a picture or an article of the White House in Washington found in the Whitehouse website is tagged with tags "White House" and "Washington". There exist several technologies to maintain the link between the piece of content in the Whitehouse website and the tags "White House" and "Washington". For example, a metadata server or XML/RDF representation can be used. Search terms provided by a user (e.g., "White House Washington") can be candidate descriptive tags, and the confirmation of an offered search result by the user (e.g., picture of the White House in Washington) can be interpreted as an acknowledgement that the description applies to this selected resource.

Figure 2:
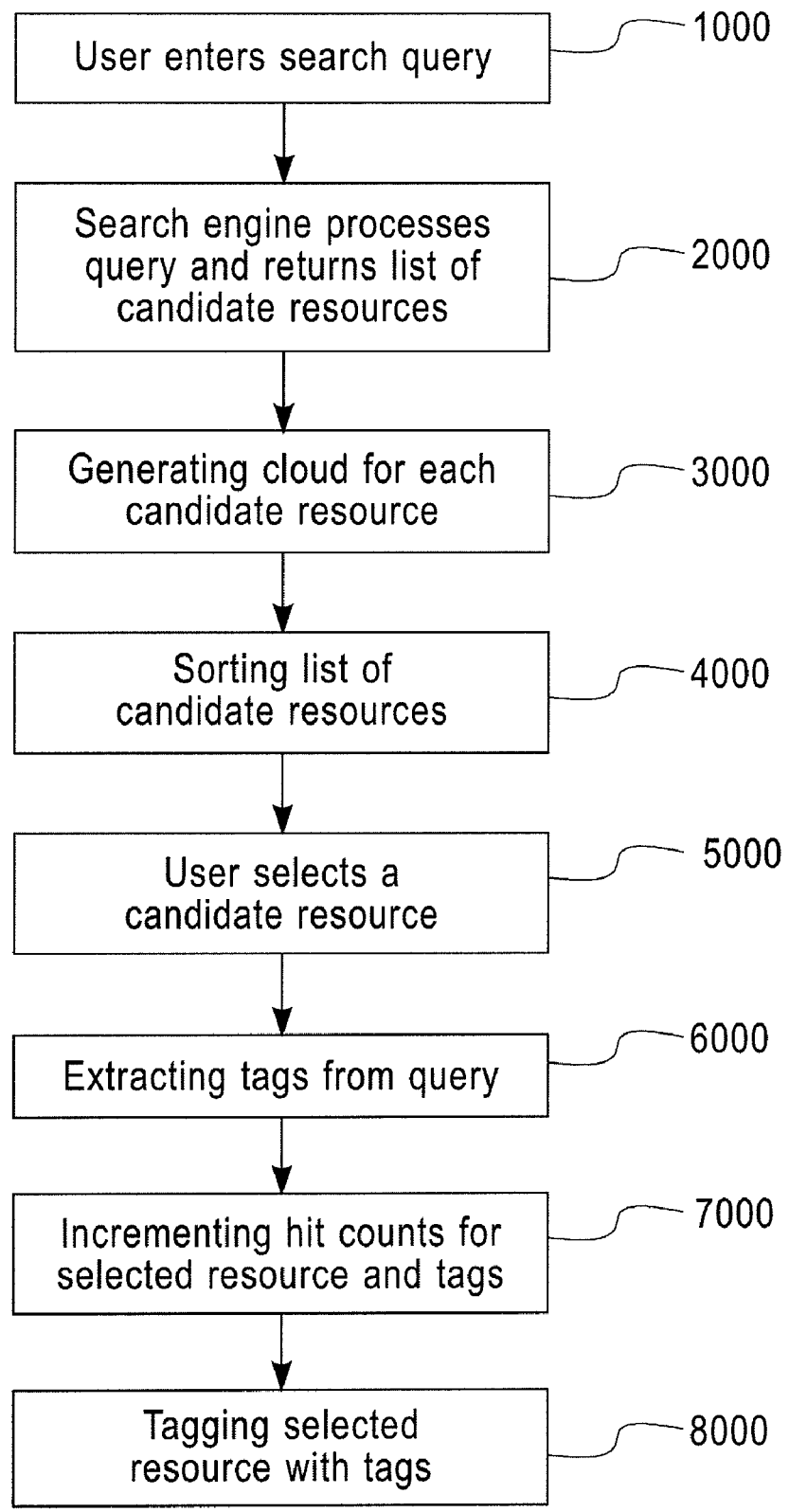
FIG. 2 describes a method of acquiring tags during web search and improving web search according to an exemplary embodiment of the present invention.

FIG. 2 describes a method of acquiring tags during web search and improving web search according to an exemplary embodiment of the present invention.

Referring to FIG. 2, in block 1000, a user enters a search query in a search engine. For example, a user can enter "White House Washington" in the search engine. In block 2000, the search engine processes the query and returns a list of candidate resources. The candidate resources can be listed under resource names such as, for example, their Uniform Resource Locators (URLs).

Figures 3, 4:
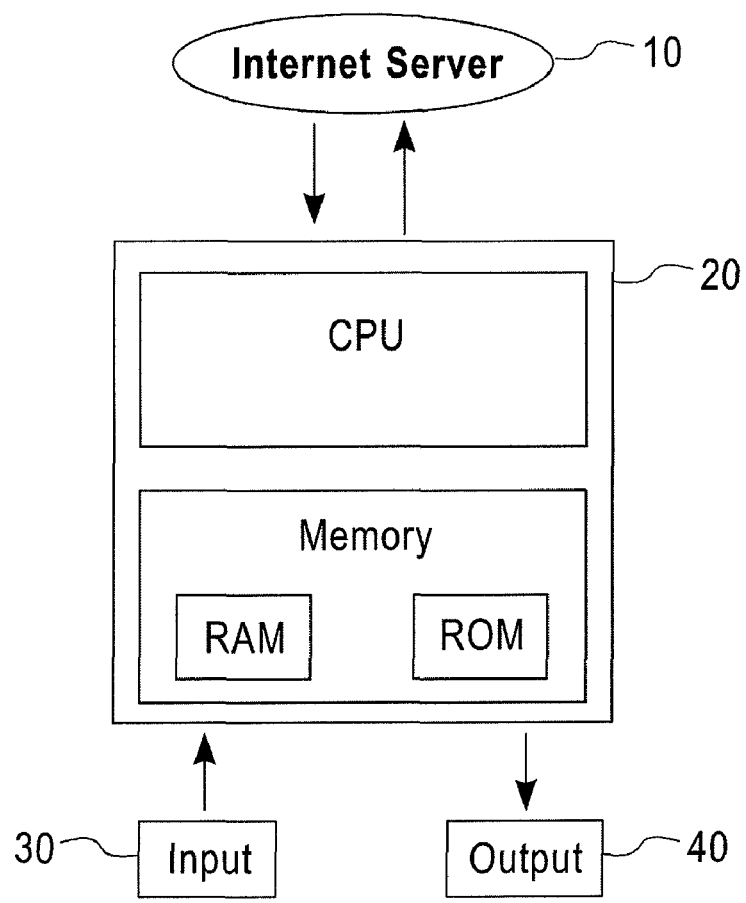
FIG. 3 shows tag cloud according to an exemplary embodiment of the present invention.
FIG. 4 shows a system having an internet server and a personal computer connected to the internet server.

In block 3000 with reference to FIGS. 2 and 3, a tag cloud is generated for each candidate resource. The tag cloud can be a graphical view where eligible tags are depicted inside, for example, a rectangular frame in which the font size of each tag is proportional to the frequency of occurrence (e.g., hit count). Eligible tags with respect to a candidate resource are those that previously led to the selection of this candidate resource following a web search whose query was referring to this tag. For example, "Washington" can be an eligible tag for the White House website. The tag cloud can appear near a corresponding candidate resource. In an exemplary embodiment, the tag cloud shown in FIG. 3 can appear near the URL of the Whitehouse website shown after a search is completed by the search engine. If the available space for the tag cloud is too confined, least used tags do not show up in the tag cloud. For example, in FIG. 3, the least used tag "elected", because "elected" has the smallest font, can be omitted.

In block 4000, candidate resources are sorted, for example, in descending order, using an index that is obtained for each candidate resource. In an exemplary embodiment, the index can be formed by adding the frequencies of occurrence (e.g., hit counts) for all eligible tags with respect to the corresponding resource.

In block 5000, a user selects a candidate resource. If the user does not select any resource, no tagging occurs.

In block 6000, tags are extracted from the query. For example, search terms contained in the user query, i.e., "White House" and "Washington" can be the tags. The search terms contained in the user query undergo filtering before the search terms become candidate tags.

Filtering that turns the search terms into candidate tags is applied to account for, for example, typing mistakes, syntactic variations, and phrases (e.g., "White House" recognized as a single unit). Individual erroneous tags can be tolerated when a sufficient (e.g., greater than about 50%) number of other users provide the corrected tags in turn. Different types of filters can be used for the filtering. Examples of the filters include a filter eliminating short articles and reducing words to syntactic base forms (e.g., plural to singular), a filter accepting only terms contained in a language dictionary or ontology, a filter considering only most frequently occurring terms (i.e., cutting off tails), a filter clustering diverging concrete terms into smaller number of more abstract and uniform terms, and a filter accepting only terms showing up in same queries by multiple different users.

In block 7000, hit counts for the selected resource and corresponding eligible tags are increased. The frequency of occurrence for each eligible tag with respect to a candidate resource is maintained by increasing a corresponding counter by one. There can be separate counters for each observed tuple (e.g., resource name and tag). For example, the URLs can serve as resource names.

In block 8000, tagging the selected resource with tags occurs. For example, a piece of content in the Whitehouse website is tagged with tags "White House" and "Washington". There exist several technologies to maintain the link between the piece of content in the Whitehouse website and the tags "White House" and "Washington". For example, a metadata server or XML/RDF representation can be used.

FIG. 3 shows a tag cloud according to an exemplary embodiment of the present invention. Referring to FIGS. 2 and 3, in an exemplary embodiment of the present invention, blocks 3000, 4000 and 7000 can be used as a method of using obtained tags for an improved web search service. For example, in block 3000, the search results are displayed as an annotated list of matching candidates. Instead of rendering each item only as an excerpt of the verbatim resource as in a conventional web search, the improved search service according to an exemplary embodiment of the present invention can display a tag cloud as an abstract summary of the document content.

For example, in FIG. 3, the tag cloud itself can be an abstract summary of the document content. In block 4000, the relative frequency of a tag can be interpreted as an indication as to how often a particular document returned by a search query was opened by the query author. The relative frequency can be used as a quality measure of the returned links. Sorting the links according to the relative frequency of the tags associated to them may give priority to those links that most users found appropriate for the original query.

FIG. 4 shows a system having an internet server and a computer connected to the internet server. Referring to FIG. 4, a computer 20 is connected to an internet server 10. The computer includes a processor such as a CPU, a memory such as a RAM or ROM, an input 30 and an output 40. The processor executes instructions to perform a method of acquiring tags using web search in cooperation with the internet server. As such a non-transitory computer readable medium embodying instructions executable by the processor may perform a method of acquiring tags using web search. For example, a search query is entered into the computer 20 through the input 30 by a user. Then, a search engine run by the internet server 10 receives the search query from the computer 20. The search query is processed by the search engine and a list of candidate resources corresponding to the search query are returned and displayed on the output 40. The output 40 includes, for example, a display screen.

Exemplary embodiments of the present invention use web searches to create and sort tags. That is, a link between searching and tagging can be exploited. Unlike conventional technologies that support tagging for special purposes, exemplary embodiments of the present invention make the otherwise costly process of tagging a free side effect from typical web searches. Users perceive no noticeable difference as far as core search functionality and quality are concerned. Thus, no extra cost for tagging is incurred on the users. Accordingly, an exemplary embodiment of the present invention can make use of the human judgment that goes into both formulating a search query as well as into later narrowing the search by picking one matching document among several offered candidates.

According to an exemplary embodiment of the present invention, an existing search engine can be used to build an automatic tagging system. This can be achieved after a search engine receives a query from a human user and after the user selects one of the candidate documents that the search engine identifies as matching the user query. As such, the automatic tagging service can be implemented as a new service that wraps a search engine (e.g., Google™ web search) without changing outside appearance or degrading search performance.

According to an exemplary embodiment of the present invention, obtained tags can be used for an improved web search service. The search result can be displayed as an annotated list of matching candidates. In addition, the relative frequency of the tags can be interpreted as an indication as to how often a particular document returned by a search query was opened by the query author. The relative frequency can be used as a quality measure of the returned links. Sorting the links according to the relative frequency of the tags associated to them may give priority to those links that most users found appropriate for the original query.

Although exemplary embodiments of the present invention have been described herein with reference to the accompanying drawings, it is to be understood that the present invention should not be limited thereto and that various other changes and modifications may be affected therein by one of ordinary skill in the related art without departing from the scope or spirit of the invention. All such changes and modifications are intended to be included within the scope of the invention.

What is claimed is:

1. A method of acquiring tags using web search, the method comprising:
   receiving a search query in a search engine;
   processing the search query by the search engine to return and a plurality of candidate resources as a list corresponding to the search query;
   generating a graphical tag cloud for each of the plurality of candidate resources returned by the search engine, wherein each of the graphical tag clouds is displayed in association with a respective candidate resource;
   sorting the list of candidate resources;
   receiving a selection of a candidate resource from the list of candidate resources;
   extracting at least one tag from the search query;
   tagging the candidate resource with an extracted tag from the search query; and
   incrementing a hit count for only the candidate resource selected from the list of candidate resources and a hit count for at least one tag associated with the candidate resource matching the extracted tags;
   wherein a frequency of occurrence for each extracted tag with respect to the candidate resource selected from the list of candidate resources is maintained by increasing a corresponding counter by one.

2. The method of claim 1, wherein a user enters the search query into a browser window that gives access to the search engine.

3. The method of claim 1, wherein processing the search query and returning the plurality of candidate resources are performed by an internet search engine.

4. The method of claim 1, wherein each of the graphical tag clouds is in an annotation format.

5. The method of claim 1, wherein the list of candidate resources are sorted in descending order using an index that is obtained for each candidate resource by adding frequencies of occurrence for entire tags with respect to a corresponding resource.

6. The method of claim 1, wherein determining the candidate resource is performed when a user selects the candidate resource.

7. The method of claim 1, further comprising filtering the search query before extracting the at least one tag from the search query.

8. The method of claim 1, wherein the tagged candidate resource is one of a picture or an article, or any other digital document that can be accessed on the internet.

9. A non-transitory computer readable medium embodying instructions executable by a processor to perform a method of acquiring tags using web search, the method comprising:
   receiving a search query in a search engine;
   processing the search query by the search engine to return and a plurality of candidate resources as a list corresponding to the search query;
   generating a graphical tag cloud for each of the plurality of candidate resources returned by the search engine, wherein each of the graphical tag clouds is displayed in association with a respective candidate resource;
   sorting the list of candidate resources;
   receiving a selection of a candidate resource from the list of candidate resources;
   extracting at least one tag from the search query;
   tagging the candidate resource with an extracted tag from the search query; and
   incrementing a hit count for only the candidate resource selected from the list of candidate resources and a hit count for at least one tag associated with the candidate resource matching the extracted tags;
   wherein a frequency of occurrence for each extracted tag with respect to the candidate resource selected from the list of candidate resources is maintained by increasing a corresponding counter by one.

* * * * *